(12) United States Patent
Chatterjee et al.

(10) Patent No.: US 9,014,915 B2
(45) Date of Patent: Apr. 21, 2015

(54) ACTIVE SAFETY CONTROL FOR VEHICLES

(75) Inventors: Aamrapali Chatterjee, Okemos, MI (US); Chad T. Zagorski, Clarkston, MI (US); Paul R. Williams, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 777 days.

(21) Appl. No.: 13/190,379

(22) Filed: Jul. 25, 2011

(65) Prior Publication Data
US 2013/0030657 A1    Jan. 31, 2013

(51) Int. Cl.
| | |
|---|---|
| B60R 21/00 | (2006.01) |
| B60W 30/00 | (2006.01) |
| B60W 50/08 | (2012.01) |
| B60W 30/08 | (2012.01) |
| B60W 30/12 | (2006.01) |
| B60W 30/14 | (2006.01) |
| B60W 40/00 | (2006.01) |
| B60W 40/09 | (2012.01) |

(52) U.S. Cl.
CPC .............. *B60W 30/00* (2013.01); *B60W 50/08* (2013.01); *B60W 30/08* (2013.01); *B60W 30/12* (2013.01); *B60W 30/14* (2013.01); *B60W 40/00* (2013.01); *B60W 40/09* (2013.01)

(58) Field of Classification Search
CPC ..... B60W 30/00; B60W 30/08; B60W 30/09; B60W 30/12; B60W 30/14; B60W 30/143; B60W 30/146; B60W 30/16; B60W 30/162; B60W 40/00; B60W 40/08; B60W 40/09; B60W 50/08; B60W 50/085; B60W 50/14; B60W 2040/08; B60W 2040/0818; B60W 2040/0827; B60W 2040/0836; B60W 2040/0845; B60W 2040/0854; B60W 2040/0863

USPC .......... 701/1, 41, 44, 93, 96, 98, 301, 46–48; 340/576, 903

See application file for complete search history.

(56) References Cited

U.S. PATENT DOCUMENTS

| | | | | |
|---|---|---|---|---|
| 5,594,645 | A | * | 1/1997 | Nishimura et al. ............. 701/96 |
| 5,675,313 | A | * | 10/1997 | Keluskar .................... 340/425.5 |
| 5,695,020 | A | * | 12/1997 | Nishimura .................... 180/169 |
| 6,059,686 | A | * | 5/2000 | Takahashi ....................... 477/47 |
| 7,124,027 | B1 | * | 10/2006 | Ernst et al. .................... 701/301 |

(Continued)

FOREIGN PATENT DOCUMENTS

CN    101296833 A    10/2008

OTHER PUBLICATIONS

State Intellectual Property Office of the Peoples' Republic of China, Office Action in Chinese Patent Application No. 201210259126.1, mailed Oct. 8, 2014.

*Primary Examiner* — Thomas G Black
*Assistant Examiner* — Ce Li
(74) *Attorney, Agent, or Firm* — Ingrassia Fisher & Lorenz, P.C.

(57) ABSTRACT

Methods, systems, and vehicles are provided for controlling active safety functionality for a vehicle. The active safety functionality provides an action during a drive cycle of the vehicle based on a predetermined threshold. Data pertaining to driving conditions, usage conditions of the vehicle, or both, is obtained for a drive cycle of the vehicle. A risk factor grade is calculated using the data. The risk factor grade corresponds to a level of situational risk for the drive cycle. The predetermined threshold of the active safety system is adjusted based on the risk factor grade.

18 Claims, 4 Drawing Sheets

(56) References Cited

U.S. PATENT DOCUMENTS

| | | | |
|---|---|---|---|
| 7,561,032 B2* | 7/2009 | Huang et al. | 340/435 |
| 7,663,495 B2 | 2/2010 | Haque et al. | |
| 8,548,709 B2* | 10/2013 | Morita | 701/70 |
| 2004/0181334 A1* | 9/2004 | Blumbergs et al. | 701/200 |
| 2004/0183685 A1* | 9/2004 | Strumolo et al. | 340/575 |
| 2004/0209594 A1* | 10/2004 | Naboulsi | 455/404.1 |
| 2004/0254729 A1* | 12/2004 | Browne et al. | 701/301 |
| 2006/0103513 A1* | 5/2006 | Ihara et al. | 340/435 |
| 2006/0106538 A1* | 5/2006 | Browne et al. | 701/301 |
| 2006/0217860 A1* | 9/2006 | Ihara | 701/41 |
| 2006/0220915 A1* | 10/2006 | Bauer | 340/945 |
| 2007/0069874 A1* | 3/2007 | Huang et al. | 340/435 |
| 2007/0142996 A1* | 6/2007 | Lee | 701/96 |
| 2007/0146146 A1* | 6/2007 | Kopf et al. | 340/575 |
| 2007/0225882 A1* | 9/2007 | Yamaguchi et al. | 701/36 |
| 2008/0065293 A1* | 3/2008 | Placke et al. | 701/41 |
| 2008/0154629 A1* | 6/2008 | Breed et al. | 705/1 |
| 2008/0185207 A1* | 8/2008 | Kondoh | 180/272 |
| 2008/0231703 A1* | 9/2008 | Nagata et al. | 348/148 |
| 2009/0024322 A1* | 1/2009 | Tomita et al. | 701/211 |
| 2009/0091435 A1 | 4/2009 | Bolourchi | |
| 2009/0234552 A1* | 9/2009 | Takeda et al. | 701/96 |
| 2009/0326780 A1* | 12/2009 | Waibel et al. | 701/96 |
| 2010/0030434 A1* | 2/2010 | Okabe et al. | 701/48 |
| 2011/0295467 A1* | 12/2011 | Browne et al. | 701/46 |
| 2012/0212353 A1* | 8/2012 | Fung et al. | 340/905 |

* cited by examiner

ACTIVE SAFETY CONTROL FOR VEHICLES

TECHNICAL FIELD

The present disclosure generally relates to the field of vehicles and, more specifically, to methods and systems for controlling active safety functionality for vehicles.

BACKGROUND

Many vehicles today have one or more active safety functionality systems, such as a forward collision alert (FCA) system, forward and rear collision preparation systems (CPS), enhanced collision avoidance (ECA) system, lane departure warning (LDW) system, lane keeping assistance (LKA) system, lane change assistance (LCA) system, adaptive cruise control (ACC), full speed range adaptive cruise control (FSRACC), and/or freeway limited ability autonomous driving (FLAAD) system. Such active safety functionality supplements traditional driver control of the vehicle with one or more warnings or automated actions in appropriate conditions. While active safety functionality serves valuable purposes, it may be desirable to tailor the active safety functionality to specific driving conditions and/or usage of the vehicle.

Accordingly, it is desirable to provide improved methods for controlling active safety functionality of vehicles, for example in a manner that is tailored to specific driving conditions and/or usage of the vehicle. It is also desirable to provide improved systems for controlling active safety functionality of vehicles, for example in a manner that is tailored to specific driving conditions and/or usage of the vehicle. It is further desirable to provide vehicles that include such improved methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling active safety functionality for a vehicle. The active safety functionality provides an action during a drive cycle of the vehicle based on a predetermined threshold. The method comprises the steps of obtaining data pertaining to driving conditions, usage conditions of the vehicle, or both, for the drive cycle, calculating a risk factor grade via a processor using the data, and adjusting a predetermined threshold of the active safety functionality based on the risk factor grade. The risk factor grade corresponds to a level of situational risk for the drive cycle.

In accordance with another exemplary embodiment, a system if provided for controlling active safety functionality for a vehicle. The active safety functionality provides an action during a drive cycle of the vehicle based on a predetermined threshold. The system comprises a memory and a processor. The memory is configured to store the predetermined threshold. The processor is coupled to the memory, and is configured to obtain data pertaining to driving conditions, usage conditions of the vehicle, or both, for the drive cycle, calculate a risk factor grade using the data, and adjust the predetermined threshold of the active safety functionality based on the risk factor grade. The risk factor grade corresponds to a level of situational risk for the drive cycle.

In accordance with a further exemplary embodiment, a vehicle is provided. The vehicle comprises a drive system, an active safety system, and a controller. The active safety system is coupled to the drive system, and is configured to provide an action during a drive cycle of the vehicle based on a predetermined threshold. The controller is coupled to the active safety system, and is configured to obtain data pertaining to a drive cycle of the vehicle, the data pertaining to driving conditions, usage conditions of the vehicle, or both, during the drive cycle, calculate a risk factor grade using the data, and adjust the predetermined threshold of the active safety system based on the risk factor grade. The risk factor grade corresponds to a level of situational risk for the drive cycle.

BRIEF DESCRIPTION OF THE DRAWINGS

The present disclosure will hereinafter be described in conjunction with the following drawing figures, wherein like numerals denote like elements, and wherein:

FIG. 3 is a flowchart of a sub-process for the process of FIG. 2, namely, a sub-process for calibrating a risk factor grade for a drive cycle for the vehicle, and that can be used in connection with the vehicle of FIG. 1 and the active safety control system of FIGS. 1 and 2, in accordance with an alternate exemplary embodiment.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
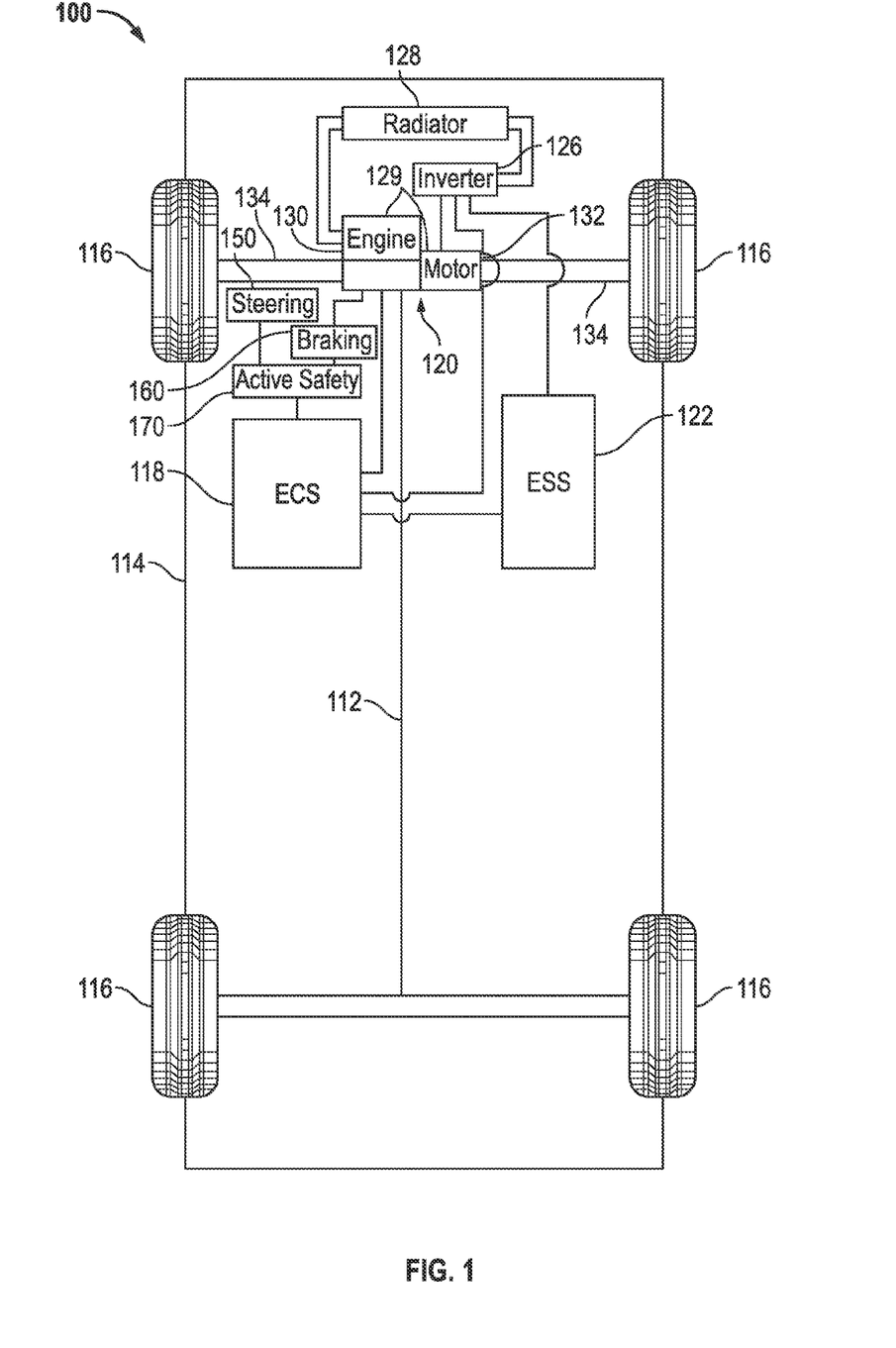
FIG. 1 is a functional block diagram of a vehicle that includes an active safety control system, in accordance with an exemplary embodiment.

FIG. 1 illustrates a vehicle 100, or automobile, according to an exemplary embodiment. As described in greater detail further below, the vehicle 100 includes an active safety control system ("ASCS") 170 for optimized control of active safety functionality for the vehicle 100 that is tailored to specific driving conditions and vehicle usage for a driving cycle for the vehicle. The vehicle 100 is also referenced at various points throughout this application as the host vehicle.

The vehicle 100 includes a chassis 112, a body 114, four wheels 116, an electronic control system 118, a steering system 150, a braking system 160, and an active safety system 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, an energy storage system (ESS) 122, a power inverter assembly (or inverter) 126, and a radiator 128. The actuator assembly 120 includes at least one electric propulsion system 129 mounted on the chassis 112 that drives the wheels 116. In the depicted embodiment, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The ESS 122 is mounted on the chassis 112, and is electrically connected to the inverter 126. The ESS 122 preferably comprises a battery having a pack of battery cells. In one embodiment, the ESS 122 comprises a lithium iron phosphate battery, such as a nanophosphate lithium ion battery. Together the ESS 122 and electric propulsion system(s) 129 provide a drive system to propel the vehicle 100.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 130 and the inverter 126.

The steering system 150 is mounted on the chassis 112, and controls steering of the wheels 116. The steering system 150 includes a steering wheel and a steering column. The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lightning units, navigation systems, and the like (also not depicted).

The ASCS 170 is mounted on the chassis 112. The ASCS 170 may be coupled to various other vehicle devices and systems, such as, among others, the actuator assembly 120, the steering system 150, the braking system 160, and the electronic control system 118. The ASCS 170 provides various active safety controls (including adjustments for active safety systems such as forward collision alert (FCA) systems, front and rear collision preparation systems (CPS), enhanced collision avoidance (ECA) systems, lane departure warning (LDW) systems, lane keeping assistance (LKA) systems, lane change assistance (LCA) systems, freeway limited ability autonomous driving (FLAAD) systems, full speed range adaptive cruise control (FSRACC) systems, and adaptive cruise control (ACC) systems), based on specific driving conditions and usage of the vehicle 100 during the current drive cycle. In addition, although not illustrated as such, the ASCS 170 (and/or one or more components thereof) may be integral with the electronic control system 118 and may also include one or more power sources. The ASCS 170 preferably conducts various steps of the process 300 and the steps and sub-processes thereof of FIGS. 3 and 4.

Figure 2:
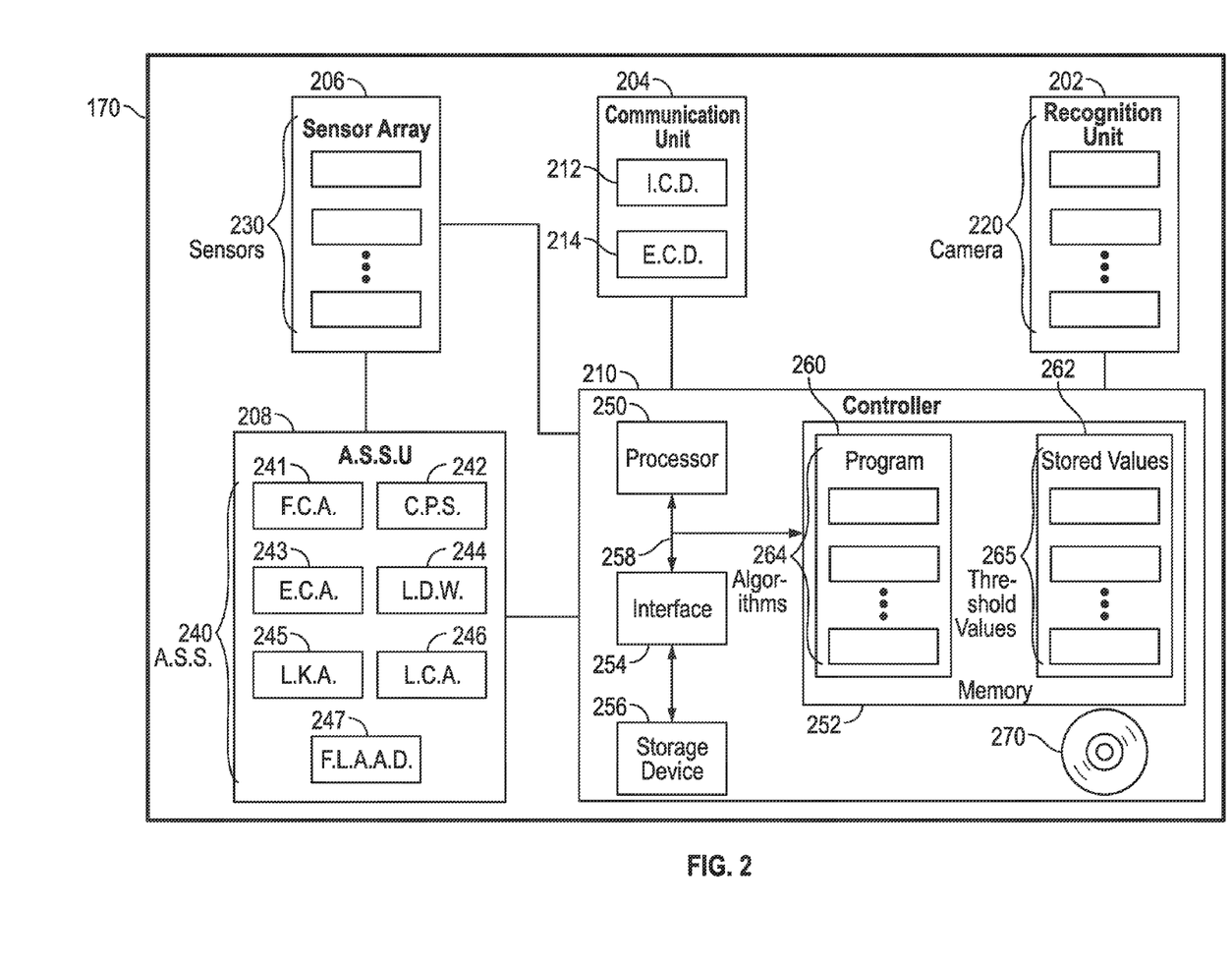
FIG. 2 is a functional block diagram of the active safety control system of FIG. 1, in accordance with an exemplary embodiment.

With reference to FIG. 2, a functional block diagram is provided for the ASCS 170 of FIG. 1, in accordance with an exemplary embodiment. As depicted in FIG. 2, the ASCS 170 includes a recognition unit 202, a communication unit 204, a sensor array 206, an active safety system unit 208, and a controller 210.

The recognition unit 202 is used to identify a driver of the vehicle (preferably comprising the vehicle 100 of FIG. 1, and also referenced herein as the host vehicle). In a preferred embodiment, the recognition unit 202 includes one or more cameras 220. At least one such camera 220 is preferably disposed inside the vehicle, and is directed at a driver of the vehicle. This camera 220 is used to provide information as to an identity of the driver, as well as information as to whether the driver is in an attentive, driving position. In certain embodiment, one or more cameras 220 are disposed outside of the vehicle (or facing outside the vehicle), and are used to provide information regarding a lane or path of or near the vehicle, an object or other vehicle that may be near and/or approaching the vehicle, and the like. The recognition unit 202 provides these various types of information to the controller 210 for processing and for use in controlling the active safety functionality for the vehicle.

The communication unit 204 receives information regarding data as to operating conditions and usage of the vehicle. Specifically, in one embodiment, the communication unit 204 receives information as to one or more of the following: driver inputs for an accelerator pedal of the vehicle, driver inputs for a brake pedal of the vehicle, a driver's engagement of a steering wheel of the vehicle, information as to a position of the vehicle and/or of lanes on a road in which the vehicle is travelling, information regarding objects or other vehicles nearby and/or approaching the vehicle; information regarding cellular telephone usage within the vehicle, information regarding usage of controls for a radio, other entertainment system, environmental control system, mirrors, and/or other devices and/or systems of the vehicle, a time of day of the current driving cycle, a duration of the current drive cycle, a coefficient of friction of the roadway, and the like. In one embodiment, the communication unit 204 provides these various types of information to the controller 210 for processing and for use in controlling the active safety functionality for the vehicle. Per the discussion below, in certain embodiments, some or all of this information may be provided instead by the sensor array 206.

In the depicted embodiment, the communication unit 204 includes an internal communication device 212 and an external communication device 214. The internal communication device 212 preferably comprises a transceiver configured to receive various of the above information from various other devices and systems of the vehicle, outside of the ASCS 170, via a vehicle communications bus (not depicted). The external communication device 214 preferably comprises a transceiver (such as a vehicle telematics unit and/or a global communication system (GPS) device) configured to receive various of the above information from a central database and/or from a satellite system via a wireless network (not depicted).

The sensor array 206 measures parameters for data as to operating conditions and usage of the vehicle. Specifically, in one embodiment, the sensor array 206 comprises various sensors 230 that measure values of parameters pertaining to one or more of the following: driver inputs for an accelerator pedal of the vehicle, driver inputs for a brake pedal of the vehicle, a driver's engagement of a steering wheel of the vehicle, information as to a position of the vehicle and/or of lanes on a road in which the vehicle is travelling, information regarding objects or other vehicles nearby and/or approaching the vehicle; information regarding cellular telephone usage within the vehicle, information regarding usage of controls for a radio, other entertainment system, environmental control system, mirrors, and/or other devices and/or systems of the vehicle, a time of day of the current driving cycle, a duration of the current drive cycle, a coefficient of friction of the roadway, and the like. In one embodiment, the sensor array 206 provides these various types of information (and/or signals representative thereof) to the controller 210 for processing and for use in controlling the active safety functionality for the vehicle. Per the discussion above, in certain embodiments, some or all of this information may be provided instead by the communication unit 204.

The active safety system unit 208 provides active safety functionality for the vehicle 100. In the depicted embodiment, the active safety system unit 208 comprises a plurality of active safety systems for the vehicle 100, including a forward collision alert (FCA) system 241, one or more collision preparation systems (CPS) 242 (such as a front CPS and a rear CPS), an enhanced collision avoidance (ECA) system 243, a lane departure warning (LDW) system 244, a lane keeping assistance (LKA) system 245, a lane change assistance (LCA) system 246, and a freeway limited ability autonomous driving (FLAAD) system 247. In certain embodiments, the active safety system unit 208 may also include other active safety systems, such as a full speed range adaptive cruise control (FSRACC) system and/or an adaptive cruise control (ACC) system.

As depicted in FIG. 2, the active safety systems 240 are each part of the ASCS 170. In certain embodiments, one or more of the active safety systems may instead be outside the ASCS 170 and coupled to and controlled at least in part by the ASCS 170.

The controller 210 is coupled to the recognition unit 202, the communication unit 204, the sensor array 206, and the active safety system unit 208. The controller 210 processes the data and information received from the recognition unit 202, the communication unit 204, and the sensor array 206, identifies the driver of the vehicle using the data and information, and processes various parameter values pertaining to the driving conditions and usage of the vehicle using the data and information. The controller 210 utilizes the processed results in adjusting one or more thresholds of the active safety systems 240, to thereby customize and control the active safety functionality for the vehicle. In a preferred embodiment, the controller 210 performs these functions in accordance with steps of the process 300 (and sub-processes and/or sub-steps thereof) described further below in connection with FIGS. 3 and 4.

As depicted in FIG. 2, the controller 210 comprises a computer system. In certain embodiments, the controller 210 may also include one or more of the recognition unit 202, the communication unit 204, the sensor array 206, the active safety system unit 208, and/or components thereof. In addition, it will be appreciated that the controller 210 may otherwise differ from the embodiment depicted in FIG. 2. For example, the controller 210 may be coupled to or may otherwise utilize one or more remote computer systems and/or other control systems.

In the depicted embodiment, the computer system of the controller 210 includes a processor 250, a memory 252, an interface 254, a storage device 256, and a bus 258. The processor 250 performs the computation and control functions of the controller 210, and may comprise any type of processor or multiple processors, single integrated circuits such as a microprocessor, or any suitable number of integrated circuit devices and/or circuit boards working in cooperation to accomplish the functions of a processing unit. During operation, the processor 250 executes one or more programs 260 contained within the memory 252 and, as such, controls the general operation of the controller 210 and the computer system of the controller 210, preferably in executing the steps of the processes described herein, such as the steps of the process 300 (and any sub-processes thereof) in connection with FIGS. 3 and 4.

The memory 252 can be any type of suitable memory. This would include the various types of dynamic random access memory (DRAM) such as SDRAM, the various types of static RAM (SRAM), and the various types of non-volatile memory (PROM, EPROM, and flash In certain examples, the memory 252 is located on and/or co-located on the same computer chip as the processor 250.

In the depicted embodiment, the memory 252 stores the above-referenced program 260 along with one or more stored values 262 for use in controlling the active safety functionality and systems for the vehicle. Also in the depicted embodiment, one or more such programs include various algorithms 264 for active safety functionality for the vehicle (such as for the FCA system 241, CPS 242, ECA system 243, LDW system 244, LKA system 245, LCA system 246, and FLAAD system 247) that are stored in the memory 252. In addition, in the depicted embodiment, the stored values 262 include various predetermined threshold values 265 for the various active safety functionality and systems, and are also stored in the memory 252. Also, the stored values 262 include various predetermined threshold values 265 for the various active safety functionality and systems, and are also stored in the memory 252.

The bus 258 serves to transmit programs, data, status and other information or signals between the various components of the computer system of the controller 210. The interface 254 allows communication to the computer system of the controller 210, for example from a system driver and/or another computer system, and can be implemented using any suitable method and apparatus. It can include one or more network interfaces to communicate with other systems or components. The interface 254 may also include one or more network interfaces to communicate with technicians, and/or one or more storage interfaces to connect to storage apparatuses, such as the storage device 256.

The storage device 256 can be any suitable type of storage apparatus, including direct access storage devices such as hard disk drives, flash systems, floppy disk drives and optical disk drives. In one exemplary embodiment, the storage device 256 comprises a program product from which memory 252 can receive a program 260 that executes one or more embodiments of one or more processes of the present disclosure, such as the steps of the process 300 (and any sub-processes thereof) of FIGS. 3 and 4, described further below. In another exemplary embodiment, the program product may be directly stored in and/or otherwise accessed by the memory 252 and/or a disk (e.g., disk 270), such as that referenced below.

The bus 258 can be any suitable physical or logical means of connecting computer systems and components. This includes, but is not limited to, direct hard-wired connections, fiber optics, infrared and wireless bus technologies. During operation, the program 260 is stored in the memory 252 and executed by the processor 250.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 250) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 210 may also otherwise differ from the embodiment depicted in FIG. 2, for example in that the computer system of the controller 210 may be coupled to or may otherwise utilize one or more remote computer systems and/or other control systems.

Figure 3:
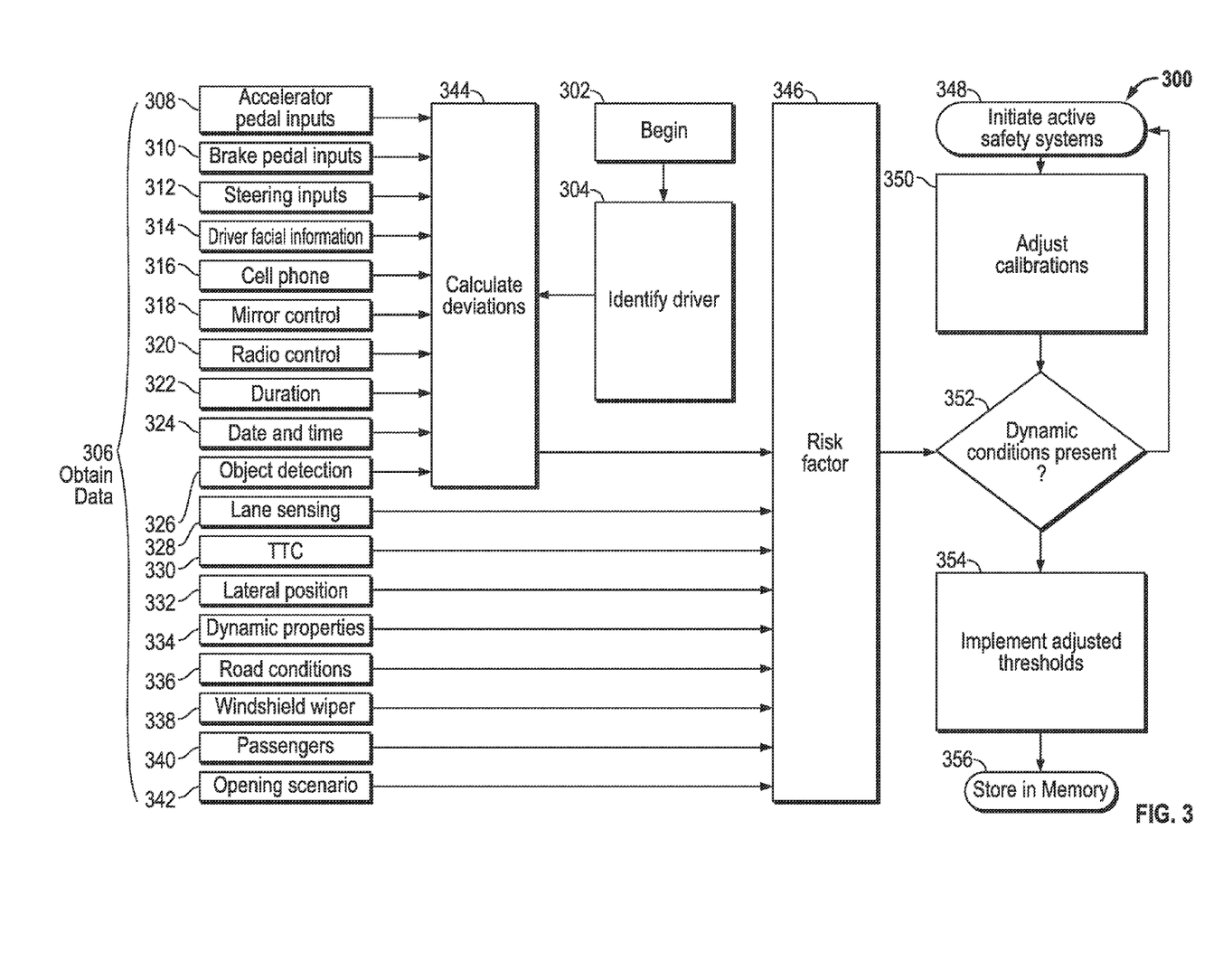
FIG. 3 is a flowchart of a process for controlling active safety functionality of a vehicle, and that can be used in connection with the vehicle of FIG. 1 and the active safety control system of FIGS. 1 and 2, in accordance with an alternate exemplary embodiment.

FIG. 3 is a flowchart of a process 300 for controlling active safety functionality for a vehicle, in accordance with an exemplary embodiment. The process 300 begins when the vehicle is being operated in a current drive cycle (or ignition cycle) (step 302).

During the current drive cycle, the driver of the vehicle is identified (step 304). The driver is preferably identified by the processor 250 of FIG. 2 based on information provided by the recognition unit 202 of FIG. 2. In one embodiment, a camera 220 of FIG. 2 provides an image of the driver from the current drive cycle to the processor 250 of FIG. 2, and the processor 250 of FIG. 2 compares the image to pre-stored images of possible drivers (for example, of all individuals of driving age in a family, or that may otherwise drive the vehicle) stored in the memory 252 of FIG. 2 as pre-stored values 262 therein, in order to ascertain the identity of the driver for the current drive cycle. In another embodiment, the identity of the driver may be determined via another manner, such as by the driver's selection of his or her identity via input controls based on a menu of possible drivers. The driver is preferably identified at or near the beginning of the current driver cycle.

Data is obtained for the drive cycle (step 306). The data pertains to driving conditions of the vehicle and usage of the vehicle by the driver and any other occupants of the vehicle. In general, the data pertains to various parameters that may have an effect on the environmental conditions for the current vehicle drive, the alertness of the driver, the responsiveness of the driver, and/or other parameters that may have an effect on the situational risk associated with the current drive cycle. The data is preferably obtained by the communication unit 204 of FIG. 2 and/or measured by the sensor array 206 of FIG. 2, and then provided to the processor 250 of FIG. 2 for processing. The data is preferably obtained and processed throughout the drive cycle, most preferably continuously throughout the drive cycle.

In the depicted embodiment, the various types of data and parameter values of step 306 are represented in the various steps (or sub-steps) 308-342 represented in FIG. 3. First, accelerator pedal inputs from the driver are obtained and monitored (step 308). The accelerator pedal inputs represent the driver's engagement of an accelerator pedal of the vehicle. Preferably, the accelerator pedal inputs include measures of a force applied by the driver to the accelerator pedal and/or a distance and/or velocity of movement of the accelerator pedal as a result of the force applied by the driver. The accelerator pedal inputs are preferably obtained by one or more sensors 230 of the sensor array 206 of FIG. 2 (such as an accelerator pedal force sensor and/or an accelerator pedal travel sensor) and provided to the processor 250 of FIG. 2 for processing. The accelerator pedal inputs may also be obtained by the communication unit 204 of FIG. 2 and provided to the processor 250 of FIG. 2 for processing.

Brake pedal inputs from the driver are also obtained and monitored (step 310). The brake pedal inputs represent the driver's engagement of a brake pedal of the vehicle. Preferably, the brake pedal inputs include measures of a force applied by the driver to the brake pedal and/or a distance and/or velocity of movement of the brake pedal as a result of the force applied by the driver. The brake pedal inputs are preferably obtained by one or more sensors 230 of the sensor array 206 of FIG. 2 (such as a brake pedal force sensor and/or a brake pedal travel sensor) and provided to the processor 250 of FIG. 2 for processing. The brake pedal inputs may also be obtained by the communication unit 204 of FIG. 2 and provided to the processor 250 of FIG. 2 for processing.

Steering inputs from the driver are also obtained and monitored (step 312). The steering inputs represent the driver's engagement of a steering wheel of the vehicle. Preferably, the steering inputs include measures of a desired steering for the wheels of the vehicle based on the driver's turning of the steering wheel. The steering inputs may be represented by an angle of the steering wheel, the steering column, and/or a wheel of the vehicle. The steering inputs are preferably obtained by one or more sensors 230 of the sensor array 206 of FIG. 2 (such as a steering wheel angle sensor, a steering column angle sensor, and/or a wheel angle sensor) and provided to the processor 250 of FIG. 2 for processing. The steering inputs may also be obtained by the communication unit 204 of FIG. 2 and provided to the processor 250 of FIG. 2 for processing.

Driver facial information is obtained and monitored (step 314). The driver facial information represents data pertaining to a positioning of the driver's face and eyes while driving the vehicle during the drive cycle (such as whether the driver maintains an alert posture, with his or her head in an appropriate, upright position and eyes focused on the road ahead). Preferably, the driver facial information is obtained by one or more cameras 220 of the recognition unit 202 and provided to the processor 250 of FIG. 2 for processing. The driver facial information may also be obtained by the communication unit 204 of FIG. 2 and provided to the processor 250 of FIG. 2 for processing.

Cell phone information is also obtained and monitored (step 316). The cell phone information represents data pertaining to whether the driver of the vehicle is using a cellular telephone and/or other electronic device unrelated to operating the vehicle. Preferably, the cell phone information is obtained by one or more sensors 230 of the sensor array 206 (for example, via a communication device of the vehicle that can communicate with and/or recognize usage of the driver's cell phone, for example via a short range wireless network) and/or one or more cameras 220 of the recognition unit 202 (for example, by recognizing via a camera image that the driver is using the cell phone) and provided to the processor 250 of FIG. 2 for processing. The cell phone information may also be obtained by the communication unit 204 of FIG. 2 and provided to the processor 250 of FIG. 2 for processing.

Mirror control information is also obtained and monitored (step 318). The mirror control information represents data pertaining to whether the driver of the vehicle is adjusting a mirror of the vehicle (such as a rear view mirror or a driver side mirror). Preferably, the mirror control information is obtained by one or more sensors 230 of the sensor array 206 (for example, a mirror control sensor) and provided to the processor 250 of FIG. 2 for processing. The mirror control information may also be obtained by the communication unit 204 of FIG. 2 and provided to the processor 250 of FIG. 2 for processing.

Radio control information is also obtained and monitored (step 320). The radio control information represents data pertaining to whether the driver of the vehicle is controlling a radio of the vehicle. Preferably, the radio control information is obtained by one or more sensors 230 of the sensor array 206 (for example, a radio control sensor) and provided to the processor 250 of FIG. 2 for processing. The radio control information may also be obtained by the communication unit 204 of FIG. 2 and provided to the processor 250 of FIG. 2 for processing.

Drive cycle duration information is also obtained and monitored (step 322). The drive cycle duration information represents data pertaining to a current or expected duration (preferably, in terms of time) of the current drive cycle. Preferably, the drive cycle duration information is obtained by the communication unit 204 of FIG. 2 (for example, as obtained from a clock onboard the vehicle obtained via a communication bus of the vehicle and/or from a remote server via a wireless network) and provided to the processor 250 of FIG. 2 for processing. The drive cycle duration information may also be obtained by one or more clocks and/or timers (not depicted) of the ASCS 170.

Date and time information is also obtained and monitored (step 324). The date and time information represents data pertaining to a current date, day of the week, and time of the current drive cycle. Preferably, the date and time information is obtained by the communication unit 204 of FIG. 2 (for example, as obtained from a calendar and clock onboard the vehicle via a communication bus of the vehicle and/or from a remote server via a wireless network) and provided to the processor 250 of FIG. 2 for processing. The date and time information may also be obtained by one or more calendars, clocks and/or timers (not depicted) of the ASCS 170.

Object detection information is also obtained and monitored (step 326). The object detection information represents data pertaining to objects that may be nearby and/or approaching the vehicle, and that may be used in ascertaining a time headway between the objects and the vehicle if the object and the vehicle remain on their current respective paths. Preferably, the object detection information is obtained by one or more sensors 230 of the sensor array 206 and/or one or more cameras 220 of the recognition unit 202 and provided to the processor 250 of FIG. 2 for processing. The object detection information may also be obtained by the communication unit 204 of FIG. 2 (for example, from one or more other vehicle modules) and provided to the processor 250 of FIG. 2 for processing.

Lane sensing information is also obtained and monitored (step 328). The lane sensing information represents data pertaining to a lane of a road or path on which the vehicle is being driven during the current drive cycle, and/or whether the vehicle is remaining within the lane or weaving out of the lane. Preferably, the lane sensing information is obtained by one or more sensors 230 of the sensor array 206 and/or one or more cameras 220 of the recognition unit 202 and provided to the processor 250 of FIG. 2 for processing. The lane sensing information may also be obtained by the communication unit 204 of FIG. 2 (for example, from one or more other vehicle modules) and provided to the processor 250 of FIG. 2 for processing.

Time to collision (TTC) information is also obtained and monitored (step 330). The TTC information represents data pertaining to a time to collision between the vehicle and another vehicle or object that is approaching and/or in the path of the vehicle. Preferably, the TTC information is calculated by the processor 250 of FIG. 2 based on information provided by one or more sensors 230 of the sensor array 206 and/or one or more cameras 220 of the recognition unit 202 (such as in steps 326 and 328, described above). The TTC information may also be obtained by the communication unit 204 of FIG. 2 (for example, from one or more other vehicle modules) and provided to the processor 250 of FIG. 2 for processing.

Lateral position information is also obtained and monitored (step 332). The lateral position information represents data pertaining to vehicles that are part of traffic travelling in lanes that are adjacent to the lane in which the vehicle is travelling during the current drive cycle. Preferably, the lateral position information is obtained by one or more sensors 230 of the sensor array 206 and/or one or more cameras 220 of the recognition unit 202 and provided to the processor 250 of FIG. 2 for processing. The lateral position information may also be obtained by the communication unit 204 of FIG. 2 (for example, from one or more other vehicle modules) and provided to the processor 250 of FIG. 2 for processing.

Dynamic property information is also obtained and monitored (step 334). In this context, dynamic property is a measure of how the target is moving, for example whether the target is oncoming toward the vehicle, whether the target is moving in the same direction as the vehicle, whether the target has moved but has since stopped, whether the target has never before been seen to be moving, whether the target is moving laterally with respect the vehicle, and the like. Preferably, the dynamic property information is calculated by the processor 250 of FIG. 2 based on information provided by one or more sensors 230 of the sensor array 206 and/or one or more cameras 220 of the recognition unit 202 (such as in step 332, described above). The dynamic property information may also be obtained by the communication unit 204 of FIG. 2 (for example, from one or more other vehicle modules) and provided to the processor 250 of FIG. 2 for processing.

Road condition information is also obtained and monitored (step 336). The road condition information represents data pertaining to a condition of the road in which the vehicle is travelling during the current vehicle cycle (preferably including a measure of the coefficient of friction of the road). Preferably, the road condition information is obtained by the communication unit 204 of FIG. 2 (for example, from one or more other vehicle modules) and provided to the processor 250 of FIG. 2 for processing. The road condition information may also be obtained by one or more sensors 230 of the sensor array 206 and provided to the processor 250 of FIG. 2 for processing.

Windshield wiper information is also obtained and monitored (step 338). The windshield wiper information represents data pertaining to whether an automatic wiper for a windshield of the vehicle has been activated. Preferably, the windshield wiper information is obtained by one or more sensors 230 of the sensor array 206 (such as a windshield wiper activation sensor) and provided to the processor 250 of FIG. 2 for processing. The windshield wiper information may also be obtained by the communication unit 204 of FIG. 2 (for example, from one or more other vehicle modules) and provided to the processor 250 of FIG. 2 for processing.

Passenger information is also obtained and monitored (step 340). The passenger information represents data pertaining to whether a passenger is present in the vehicle. Preferably, the passenger information represents data pertaining to whether a passenger is present in the front seat of the vehicle and operating one or more controls for the vehicle (such as a radio of the vehicle and/or an environmental control system of the vehicle). In one embodiment, the passenger information is obtained by one or more sensors 230 of the sensor array 206 and one or more cameras 220 of the recognition unit 202 of FIG. 2 and provided to the processor 250 of FIG. 2 for processing. Also in one embodiment, a passenger is deemed to be present and/or active if the radio controls are manipulated (for example, as detected by a radio control sensor of the sensor array 206 of FIG. 2) at the same time that the driver's face and eyes are in appropriate driving position focused on the road ahead (for example, as detected by a camera 220 of the recognition unit 202 of FIG. 2). The passenger information may also be obtained by the communication unit 204 of FIG. 2 (for example, from one or more other vehicle modules) and provided to the processor 250 of FIG. 2 for processing.

Opening scenario information is also obtained and monitored (step 342). The opening scenario information includes data pertaining to whether the target is receding from the host vehicle. In a preferred embodiment, the opening scenario information pertains to whether a range between the target and the host vehicle is increasing. In one embodiment, the opening scenario information is retrieved by the processor 250 of FIG. 2 from the memory 252 of FIG. 2, as saved from various previous drive cycles for the vehicle. In certain embodiments, information may also be obtained as to whether an active safety event and/or action has occurred recently for a particular driver of the vehicle (for example, within the previous ten most recent drive cycles in which the driver has operated the vehicle) and/or as to whether an active safety event and/or action has occurred recently (for example, within the previous ten most recent drive cycles) for the vehicle, regardless of the driver.

During step 344, deviations are calculated for the data of some or all of steps 308-342. Each deviation preferably pertains to a difference in data from one of steps 308-342 in the current drive cycle as compared with data for the same parameter(s) as obtained in one or more previous drive cycles for the same driver of the vehicle. Specifically, each deviation preferably pertains to a difference in an aspect of driver behavior or driving conditions as compared with typical behavior and/or conditions for that particular driver as determined from data from one or more prior drive cycles for the vehicle.

In a preferred embodiment, the data from the one or more prior drive cycles was obtained via the same corresponding steps of the process 300 during the prior drive cycle(s) and stored in the memory 252 of FIG. 2 as stored values 262 thereof, and are subsequently retrieved from the memory 252 and used for the comparison in step 344 of the current drive cycle. In certain embodiments, data values from an immediately preceding drive cycle are retrieved and utilized in step 344. In certain other embodiments, average data values from multiple preceding drive cycles are retrieved and utilized in step 344. The deviations are preferably calculated by the processor 250 of FIG. 2.

In the depicted embodiment of FIG. 3, the deviations are calculated separately for each of the accelerator pedal inputs of step 308, the brake pedal inputs of step 310, the steering inputs of step 312, the driver facial information of step 314, the cell phone information of step 316, the mirror control information of step 318, the radio control information of step 320, the drive cycle duration information of step 322, the date and time information of step 324, and the object detection information of step 326. In certain embodiments, deviations may also be calculated for one or more of the following: the lane sensing information of step 328, the TTC information of step 330, the lateral position information of step 332, the dynamic property information of step 334, the road condition information of step 336, the windshield wiper information of step 338, the passenger information of step 340, and/or the opening scenario information of step 342, instead of or in addition to the various other deviations noted above. Certain deviations may also be aggregated and/or averaged with one another in certain embodiments.

A risk factor grade is calculated (step 346). The risk factor grade comprises a measure of situational risk for the driving cycle based on the driving conditions and the usage of the vehicle. Preferably, the risk factor grade is calculated by the processor 250 of FIG. 2 based upon the various data obtained from steps 308-342 described above, along with the deviations from step 344 described above. In general, any data and/or deviations indicating a reduced level of responsiveness or alertness of the driver will result in a relatively higher risk factor grade (i.e., representing a relatively higher situational risk during the current drive cycle). In addition, any data and/or deviations indicating undesirable weather or other environmental conditions will similarly result in a relatively higher risk factor grade (i.e., representing a relatively higher situational risk during the current drive cycle).

For example, any deviations from 344 that vary significantly from prior or typical values of the parameters for the driver may result in a relatively higher risk factor grade. In addition, if any of the data and/or deviations indicate a reduced level of responsiveness or alertness of the driver, then this will also result in a relatively higher risk factor grade.

By way of example, any data indicating a lack of responsiveness or alertness with respect to the driver's operation of the accelerator pedal (such as a slow or inactive engagement of the accelerator pedal as detected via the accelerator pedal inputs of step 308), the brake pedal (such as a slow or inactive engagement of the brake pedal as detected via the brake pedal inputs of step 310), and/or the steering wheel (such as a slow or inactive engagement of the steering wheel as detected via the steering inputs of step 312), will also result in a relatively higher risk factor grade. In addition, if the data indicates that the driver is not paying full attention to the road ahead (for example, if the driver facial information of step 314 indicates that the driver's face or eyes are not properly positioned for driving with a focus on the road ahead, the cell phone information of step 316 indicates that the driver is using a cell phone, the mirror control information of step 318 indicates that the driver is excessively using the mirror controls, and/or the radio control information of step 320 indicates that the driver is excessively using the radio controls), then this will also result in a relatively higher risk factor grade.

A relatively higher risk factor grade will also result if the drive cycle duration information of step 322 indicates that the current drive cycle is longer than a predetermined threshold. Likewise, a relatively higher risk factor grade will also result if the date and time duration information of step 324 indicates that the current drive cycle is taking place at night, in the early morning, in rush hour, or at one or more other times in which an increased level of alertness or responsiveness may be required for the driver. Similarly, a relatively higher risk factor grade will likewise result if the road condition information of step 336 indicates any adverse driving conditions that may require an increased level of alertness or responsiveness for the driver (such as a coefficient of friction that represents a wet or slippery road), the opening scenario information of step 342 indicates that the range between the target and the host vehicle is not increasing, or if information is obtained that indicates that an active safety event and/or action has occurred in a recent drive cycle, and/or if the windshield wiper information of step 338 indicates that it is nighttime or early morning, or that the environment is otherwise dark outside the vehicle (such as if the vehicle is in a tunnel). Moreover, a relatively higher risk factor grade will also result if the object detection information of step 326, the lane sensing information of step 328, the TTC information of step 330, the lateral position information of step 332, and/or the dynamic property information of step 334 indicate that the vehicle is veering out of a current or intended lane of travel, if any objects or other vehicles are approaching or pose a threat to the vehicle, or if such data otherwise indicates an increased risk and/or a requirement for an increased level of alertness or responsiveness for the driver.

A relatively higher risk factor grade may also be generated if the passenger information of step 340 indicates that there are no other passengers, or that there are no passengers in the front seat of the vehicle. In certain embodiments, the risk factor grade may be increased for a lack of a passenger only if the current drive cycle occurs at night or in the early morning, or if the duration of the drive cycle exceeds a predetermined threshold. In certain embodiments, the presence of a passenger may be determined by a combination of a detection of manipulation of one or more vehicle controls (such as may be detected by the radio controls or mirror controls for the mirror control information of step 318 or the radio control information of step 320, respectively) combined with a detection or determination that these actions are being taking by someone other than the driver (such as from the driver facial information of step 314, if this information indicates that the driver's face and eyes are in an appropriate driving position and focused on the road ahead). The presence of such a passenger, particularly at night, in the early morning, or on a relatively long drive cycle, may result in a relatively lower risk factor grade.

Figure 4:
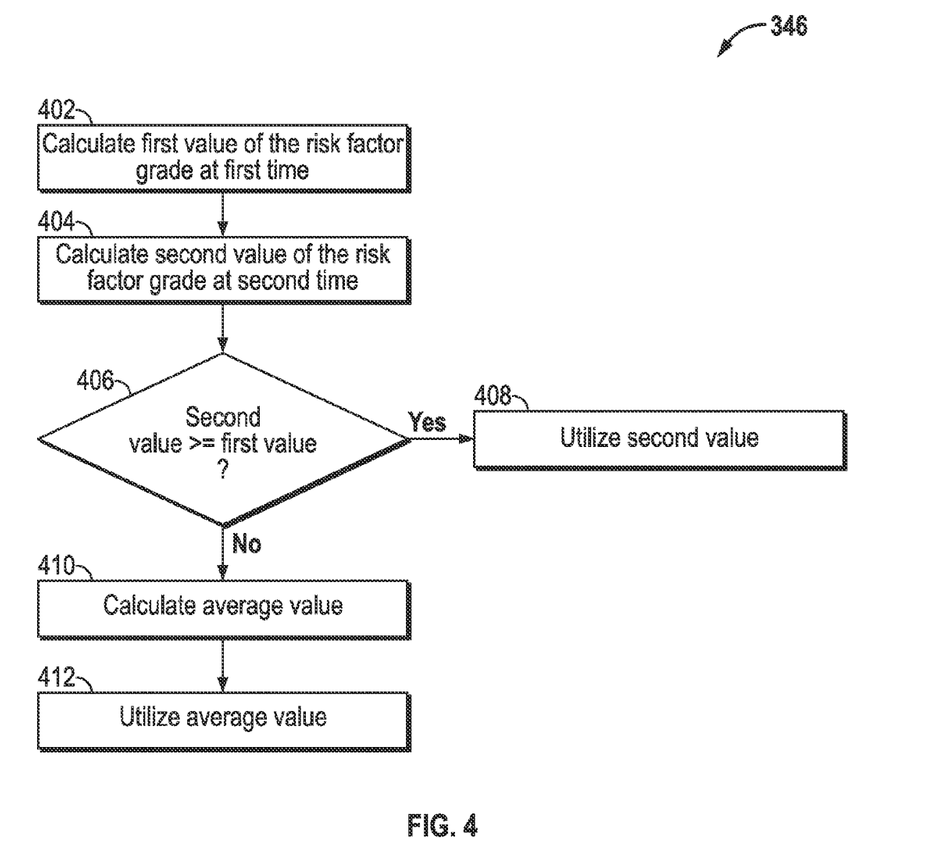

In a preferred embodiment, the risk factor grade is calculated throughout the drive cycle, preferably in a continuous manner. With reference to FIG. 4, a flowchart is provided for a sub-process of step 346, calculating the risk factor grade among multiple time periods, in accordance with an exemplary embodiment. A first value of the risk factor grade is calculated for a first time during the drive cycle (step 402). A second value of the risk factor grade is calculated for a second time during the drive cycle (step 404). In one embodiment, the first and second time periods are one minute apart. The first and second values of the risk factor grade are preferably calculated by the processor 250 of FIG. 2 in accordance with the description of step 346 of FIG. 2 provided above.

A determination is made as to whether the second value of the risk factor grade is greater than or equal to the first value of the risk factor grade (step 406). This determination is preferably made by the processor 250 of FIG. 2.

If it is determined that the second value of the risk factor grade is greater than or equal to the first value of the risk factor grade, then the second value is utilized as the current value of the risk factor grade (step 408). Conversely, if it is instead determined that the second value of the risk factor grade is less than the first value of the risk factor grade, then an average value (preferably, an arithmetic mean) is calculated for the first and second values (step 410), and the resulting average value is utilized as the current value for the risk factor grade (step 412).

The calculation of the average value of step 410 and the utilization of the respective values for the current risk factor grade of steps 408 and 412 are preferably performed by the processor 250 of FIG. 2. In a preferred embodiment, steps 402-412 repeat in this manner so that an updated current value of the risk factor grade is calculated substantially continuously (for example, every minute) throughout the drive cycle.

Returning now to FIG. 3, one or more active safety systems (or functionality) of the vehicle are initiated (step 348). The active safety systems preferably include one or more of the following: a forward collision alert (FCA) system, a collision preparation system (CPS) (such as a front CPS and/or a rear CPS), an enhanced collision avoidance (ECA) system, a lane departure warning (LDW) system, a lane keeping assistance (LKA) system, a lane change assistance (LCA) system, and a freeway limited ability autonomous driving (FLAAD) system.

One or more calibrations for the active safety systems of step 348 are adjusted based on the data, information, calculations, and determinations of steps 302-346 (step 350). In one embodiment, the predetermined thresholds correspond to the threshold conditions 265 stored in the memory 252 of FIG. 2. Preferably, adjustments are made to distance thresholds and time thresholds that trigger actions on the part of the applicable active safety system based on the current risk factor grade as calculated in step 346 (including the sub-process thereof of FIG. 4).

For example, if an action of the active safety system is triggered when the vehicle is within a certain predetermined distance of an object or an obstacle, then a relatively higher risk factor grade (indicating a relatively higher situational risk) will result in an increase in the predetermined distance threshold. Under these circumstances, the active safety system action will be taken even when the distance is somewhat greater than the typical or original threshold (i.e., the action will be taken sooner in light of the increased situational risk). Similarly, and by way of further example, if an action of the active safety system is triggered when the vehicle is within a certain predetermined time of an object or an obstacle (or from deviating into a different lane, or the like), then a relatively higher risk factor grade will also result in an increase in the predetermined time threshold. Under these circumstances, the active safety system action will be taken even when the time is somewhat greater than the typical or original threshold (i.e., the action will be taken sooner in light of the increased situational risk). Conversely, in certain embodiments, the respective predetermined distance and time thresholds may be reduced if the risk factor grade is relatively low, representing a decreased situational risk. The adjustments to the predetermined thresholds are preferably conducted by the processor 250 of FIG. 2.

One or more determinations are made as to whether dynamic conditions are present for activation of the one or more active safety systems (step 352). These determinations are preferably made by the processor 250 of FIG. 2 utilizing the adjusted calibrations of step 350. Specifically, during step 352, determinations are made in step 352 by the processor 250 of FIG. 2 as to whether the dynamic conditions are present in order to activate one or more of the active safety systems of step 348 based on the adjusted calibrations (and corresponding thresholds) of step 350. If it is determined in step 352 that the dynamic conditions are not present for the activation of one or more active safety systems, then the process returns to step 348, and steps 348-352 repeat until there is a determination in a subsequent iteration of step 352 that the dynamic conditions are present for the activation of such active safety systems.

The active safety systems are then implemented with the adjusted predetermined thresholds (step 354). Specifically, actions are taken by the respective active safety systems if parameter values (such as distance or time, as described above) meet the requirements as to the adjusted predetermined thresholds as adjusted in step 350. The actions preferably comprise warnings and/or automatic actions taken by the respective automatic safety systems to replace driver control under appropriate circumstances. Such actions may include, among others, a warning provided to the driver, automatic steering of the vehicle, automatic braking of the vehicle, and the like. Such actions may also include, among others, activating motorized seatbelt retractors, muting the radio, rolling up the windows, idling powertrain torque, flashing hazard lights, locking doors, pre-enabling passive safety countermeasures, adjusting driver and passenger seat positions and headrest position, and the like. The active safety systems are preferably implemented and controlled in this manner by the processor 250 of FIG. 2.

In addition, the data from steps 308-342 are preferably stored in memory (step 356). Specifically, the data from steps 308-342 are preferably stored in the memory 252 of FIG. 2 by the processor 250 of FIG. 2 as stored values 265 for use during a subsequent drive cycle. During the subsequent drive cycle, the stored data is preferably used for comparison with the data from steps 308-342 in the subsequent drive cycle, and for use in calculating the deviations and calculating the risk factor grade in steps 344 and 346, respectively, of the subsequent drive cycle.

Accordingly, methods, systems, and vehicles are provided for controlling active safety functionality for vehicles. The methods, systems, and vehicles tailor predetermined thresholds of the active safety systems implementing the active safety functionality based on a risk factor grade. The risk factor grade reflects various levels of situational risk that may be present due to specific driving conditions and vehicle usage. As a result, the active safety systems can take appropriate actions sooner in situations in which environmental and/or road conditions may be less than desirable, the driver's alertness and/or responsiveness may be comprised, and the like, to thereby provide improvements in the implementation of the active safety features.

It will be appreciated that the disclosed methods, systems, and vehicles may vary from those depicted in the Figures and described herein. For example, the vehicle 100, ASCS 170, and/or various components thereof may vary from that depicted in FIGS. 1 and 2 and described in connection therewith. In addition, it will be appreciated that certain steps of the process 300 (and/or sub-processes or sub-steps thereof) may vary from those depicted in FIGS. 3 and 4 and/or described above in connection therewith. It will similarly be appreciated that certain steps of the process described above (and/or sub-processes or sub-steps thereof) may occur simultaneously or in a different order than that depicted in FIGS. 3 and 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling active safety functionality for a vehicle, the active safety functionality providing an action during a drive cycle of the vehicle based on a predetermined threshold, the method comprising the steps of:
    obtaining data pertaining to driving conditions for a road on which the vehicle is travelling and usage conditions of the vehicle for the drive cycle;
    calculating a risk factor grade using the data, the risk factor grade corresponding to a level of situational risk for the drive cycle via a processor based on both the driving conditions of the road and the usage conditions of the vehicle; and
    adjusting the predetermined threshold of the active safety functionality based on the risk factor grade, wherein:
        the step of calculating the risk factor grade comprises the steps of:
            calculating a first value of the risk factor grade at a first time during the drive cycle; and
            calculating a second value of the risk factor grade at a second time during the drive cycle, the second time being subsequent to the first time; and
        the step of adjusting the predetermined threshold comprises the steps of:
            adjusting the predetermined threshold based on the second value of the risk factor grade if the second value of the risk factor grade is greater than the first value of the risk factor grade; and
            adjusting the predetermined threshold based on an average of the first value of the risk factor grade and the second value of the risk factor grade if the second value of the risk factor grade is less than the first value of the risk factor grade.

2. The method of claim 1, wherein the vehicle has a driver, and the method further comprises the step of:
    obtaining prior data pertaining to a driving behavior of the driver during a prior driving cycle;
    wherein:
        the step of obtaining the data comprises the step of obtaining the data pertaining to the driving behavior of the driver during a current driving cycle; and
        the step of calculating the risk factor grade comprises the step of calculating the risk factor grade based at least in part on a comparison between the driving behavior during the current driving cycle and the driving behavior during the prior driving cycle.

3. The method of claim 1, wherein the active safety functionality is selected from the group consisting of:
    a forward collision alert (FCA) system, a collision preparation system (CPS), an enhanced collision avoidance (ECA) system, a lane departure warning (LDW) system, a lane keeping assistance (LKA) system, a lane change assistance (LCA) system, an adaptive cruise control system (ACC), a full-speed range adaptive cruise control system (FSRACC), and a freeway limited ability autonomous driving (FLAAD) system.

4. The method of claim 1, wherein the predetermined threshold comprises a predetermined distance threshold, a predetermined time threshold, or both, and the step of adjusting the predetermined threshold comprises the step of:
adjusting the predetermined distance threshold, the predetermined time threshold, or both, based on the risk factor grade.

5. The method of claim 1, wherein the risk factor grade is calculated based at least in part upon a driver's engagement of a brake pedal of the vehicle.

6. The method of claim 1, wherein the risk factor grade is calculated based at least in part upon a driver's engagement of an accelerator pedal of the vehicle.

7. The method of claim 1, wherein the risk factor grade is calculated based at least in part upon a driver's engagement of a radio control of the vehicle.

8. The method of claim 1, wherein the risk factor grade is calculated based at least in part upon whether a driver of the vehicle is using a telephone.

9. The method of claim 1, wherein the driving conditions comprise a weather condition for the road on which the vehicle is travelling.

10. The method of claim 1, wherein the driving conditions comprise a coefficient of friction for the road on which the vehicle is travelling.

11. A system for controlling active safety functionality for a vehicle, the active safety functionality providing an action during a current drive cycle of the vehicle based on a predetermined threshold, the system comprising:
a memory configured to store the predetermined threshold; and
a processor coupled to the memory and configured to:
obtain data pertaining to:
a driving behavior of a driver of the vehicle during a prior driving cycle of the vehicle, the prior driving cycle occurring prior to the current drive cycle; and
the driving behavior of the driver during the current driving cycle;
calculate a risk factor grade using the data, the risk factor grade corresponding to a level of situational risk for the drive cycle, the risk factor grade calculated based at least in part on a comparison between the driving behavior during the prior driving cycle and the driving behavior during the current driving cycle; and
adjust the predetermined threshold of the active safety functionality based on the risk factor grade,
wherein the processor is further configured to:
calculate a first value of the risk factor grade at a first time during the drive cycle;
calculate a second value of the risk factor grade at a second time during the drive cycle, the second time being subsequent to the first time;
adjust the predetermined threshold based on the second value of the risk factor grade if the second value of the risk factor grade is greater than the first value of the risk factor grade; and
adjust the predetermined threshold based on an average of the first value of the risk factor grade and the second value of the risk factor grade if the second value of the risk factor grade is less than the first value of the risk factor grade.

12. The system of claim 11, wherein the processor is further configured to calculate the risk factor grade as a measure of responsiveness of the driver.

13. The system of claim 11, wherein the processor is further configured to calculate the risk factor grade as a measure of alertness of the driver.

14. The system of claim 11, wherein the processor is configured to calculate the risk factor grade based on a comparison of the driver's engagement of one or more of a brake pedal of the vehicle, an accelerator pedal of the vehicle, or a radio control of the vehicle during the prior driving cycle versus engagement of the one or more of the brake pedal of the vehicle, the accelerator pedal of the vehicle, or the radio control of the vehicle during the current driving cycle.

15. A vehicle comprising:
a drive system;
an active safety system coupled to the drive system and configured to provide an action during a drive cycle of the vehicle based on a predetermined threshold; and
a controller coupled to the active safety system and configured to:
obtain data pertaining to driving conditions, usage conditions of the vehicle, or both, for the drive cycle;
calculate a first risk factor grade using the data at a first time during the drive cycle, the first risk factor grade corresponding to a level of situational risk at the first time during the drive cycle; and
calculate a second value of the risk factor grade at a second time during the drive cycle, the second time being subsequent to the first time, the second risk factor grade corresponding to the level of situational risk at the second time during the drive cycle;
adjust the predetermined threshold of the active safety system based on the second value of the risk factor grade if the second value of the risk factor grade is greater than the first value of the risk factor grade; and
adjust the predetermined threshold based on an average of the first value of the risk factor grade and the second value of the risk factor grade if the second value of the risk factor grade is less than the first value of the risk factor grade.

16. The vehicle of claim 15, wherein the controller is further configured to calculate the first and second values of the risk factor grade as a measure of responsiveness of the driver at the first time and the second time, respectively.

17. The vehicle of claim 15, wherein the controller is further configured to calculate the first and second values of the risk factor grade as a measure of alertness of the driver at the first time and the second time, respectively.

18. The vehicle of claim 15, wherein the average comprise an arithmetic mean of the first value of the risk factor grade and the second value of the risk factor grade.

* * * * *